United States Patent
Dierksmeier (10) Patent No.: US 11,111,855 B2
(45) Date of Patent: Sep. 7, 2021

(54) INLET PARTICLE SEPARATOR

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 141 days.

(21) Appl. No.: 16/420,802

(22) Filed: May 23, 2019

(65) Prior Publication Data
US 2020/0370475 A1   Nov. 26, 2020

(51) Int. Cl.
F02C 7/052 (2006.01)
F02C 7/042 (2006.01)
F02C 7/057 (2006.01)

(52) U.S. Cl.
CPC .............. F02C 7/052 (2013.01); F02C 7/042 (2013.01); F02C 7/057 (2013.01); F05D 2220/32 (2013.01)

(58) Field of Classification Search
CPC .................................. F02C 7/05; F02C 7/052
See application file for complete search history.

(56) References Cited

U.S. PATENT DOCUMENTS

| 3,733,814 | A | 5/1973 | Hull, Jr. et al. |
| 3,979,903 | A * | 9/1976 | Hull, Jr. ............... F02C 7/05 60/39.092 |
| 5,123,240 | A | 6/1992 | Frost et al. |
| 5,279,109 | A | 1/1994 | Liu et al. |
| 7,927,408 | B2 * | 4/2011 | Sheoran ............... B01D 45/04 96/397 |
| 9,046,056 | B2 | 6/2015 | Lerg |
| 9,500,129 | B2 | 11/2016 | Schmittenberg et al. |
| 9,719,352 | B2 | 8/2017 | Sheoran et al. |
| 9,945,260 | B2 | 4/2018 | Lukowski et al. |
| 10,850,863 | B2 * | 12/2020 | Bisson ............... B64D 41/00 |
| 2007/0000232 | A1 | 1/2007 | Powell et al. |

OTHER PUBLICATIONS

Layosa—Rotary to Linear Motion—Nov. 29, 2017 (Year: 2017).*

* cited by examiner

*Primary Examiner* — Juan G Flores
(74) *Attorney, Agent, or Firm* — Barnes & Thornburg LLP (57) ABSTRACT

A gas turbine engine includes an engine core, a propulsion unit, and a particle separator. The engine core is configured to combust fuel and air to drive rotation of the propulsion unit. The propulsion unit is driven to rotate by the engine core to provide thrust for the gas turbine engine. The particle separator is configured to separate unwanted particles from air being directed toward the engine core.

17 Claims, 3 Drawing Sheets

INLET PARTICLE SEPARATOR

FIELD OF THE DISCLOSURE

The present disclosure relates generally to gas turbine engines, and more specifically to particle separators included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine and communicated to the compressor via a core passageway. In some operating conditions, particles may be entrained in the air such as dust, sand, or liquid water and may be drawn into the engine and passed through the core passageway to the compressor. Such particles may impact components of the compressor and turbine causing damage and wear. This damage and wear may decrease power output of the engine, shorten the life span of the engine, and lead to increased maintenance costs and down time of the engine.

SUMMARY

The present disclosure may comprise one or more of the following features and combinations thereof.

A gas turbine engine may include an engine core, a propulsion unit, and an inlet particle separator. The engine core may include a compressor, a combustor, and a turbine. The propulsion unit may be powered by the engine core. The propulsion unit may include a drive shaft and a bladed rotor. The drive shaft may be coupled with the engine core and configured to be driven to rotate about an axis by the turbine when the gas turbine engine is in a first operational mode. The bladed rotor may be coupled with the engine core and configured to be driven to rotate about the axis by the turbine when the gas turbine engine is in a second operational mode.

The inlet particle separator is configured to receive a flow of fluid and may move between a first arrangement in response to the gas turbine engine being in the first operational mode and a second arrangement in response to the gas turbine engine being in the second operational mode. The inlet particle separator may separate the flow of fluid into engine core air and scavenge air. The inlet particle separator may direct the engine core air toward the compressor of the engine core and direct the scavenge air around the engine core when the inlet particle separator is in the first arrangement. The inlet particle separator may not separate the flow of fluid and direct the flow of fluid toward the compressor of the engine core when the inlet particle separator is in the second arrangement.

In some embodiments, the inlet particle separator includes an inner wall, an outer wall, and a moveable wall. The inner wall may be arranged circumferentially around the axis. The outer wall may be arranged circumferentially around the inner wall. The moveable wall may be arranged circumferentially around the inner wall and configured to move relative to the outer wall between a first position and a second position. The inlet particle separator is in the first arrangement when the moveable wall is in the first position and the inlet particle separator is in the second arrangement when the moveable wall is in the second position.

In some embodiments, the moveable wall and the inner wall define an inlet of the inlet particle separator configured to receive the flow of fluid. The inner wall and the outer wall define an engine channel in fluid communication with the compressor. The moveable wall may be spaced apart from the outer wall to define an inlet to a scavenge channel between the moveable wall and the outer wall when the moveable wall is in the first position. The inlet particle separator may be configured to conduct the scavenge air into the scavenge channel when the inlet particle separator is in the first arrangement. The moveable wall may engage the outer wall to close the inlet to the scavenge channel when the inlet particle separator is in the second arrangement.

In some embodiments, the moveable wall is configured to translate between the first position and the second position. In some embodiments, the gas turbine engine includes a bypass duct arranged around the bladed rotor and the engine core to define a bypass channel. The bypass duct may be configured to conduct bypass air around the engine core. The inlet particle separator may direct the scavenge air into the bypass channel and around the engine core when the inlet particle separator is in the first arrangement.

In some embodiments, the inlet particle separator includes an inner wall arranged circumferentially around the axis, an outer wall arranged circumferentially around the inner wall to define an engine channel, and a moveable wall arranged around the inner wall to define an inlet of the inlet particle separator. The engine channel may be configured to direct the flow of fluid into the engine core of the gas turbine engine. The moveable wall may be spaced apart from the outer wall to define a scavenge channel that is fluidly connected with the inlet and the bypass channel when the moveable wall is in the first position. The moveable wall may engage the outer wall and block fluid communication between the inlet and the bypass channel through the scavenge channel when the moveable wall is in the second position.

In some embodiments, the inlet particle separator includes a controller. The controller may be configured to move the moveable wall to the first position in response to a difference in pressure between the inlet and the bypass channel being greater than a predetermined value.

In some embodiments, the gas turbine engine includes a plurality of variable pitch airfoils located upstream of the inlet particle separator. Each of the variable pitch airfoils includes an inner member and an outer member located radially outward of the inner member and rotatable relative to the inner member.

In some embodiments, the outer member of each of the variable pitch airfoils is rotated relative to the inner member to reduce the flow of fluid through the outer member when the gas turbine engine is in the first operational mode. The outer member of each of the variable pitch airfoils may be generally aligned with the inner member when the gas turbine engine is in the second operational mode.

According to another aspect of the present disclosure, an inlet particle separator includes an inner wall, an outer wall, and a moveable wall. The inner wall is arranged circumferentially around an axis. The outer wall is arranged circumferentially around the inner wall. The inner wall and the outer wall cooperate to define an engine channel configured to direct fluid into an engine core of the gas turbine engine.

The moveable wall is located axially at least partially upstream of the outer wall and arranged circumferentially around the inner wall to define the engine channel radially between the moveable wall and the inner wall.

The moveable wall may be moveable between a first position and a second position. In the first position, the moveable wall may be spaced apart from the outer wall to define an inlet to a scavenge channel radially between the moveable wall and the outer wall and to separate fluid flow into scavenge air directed into the scavenge channel and engine core air directed into the engine channel. In the second position, the moveable wall may be engaged with the outer wall to close the scavenge channel so that all of the fluid flow is directed into the engine channel.

In some embodiments, the inlet particle separator includes a control system that includes an actuator and a controller. The actuator may be coupled with the moveable wall and configured to move the moveable wall between the first position and the second position. The controller may be connected with the actuator and configured to activate the actuator.

In some embodiments, the actuator includes a linear arm and a leaver shaft. The linear arm is coupled with the moveable wall and extends axially relative to the axis. The leaver shaft is coupled with the linear arm. The leaver shaft extends radially outward away from the axis along a shaft axis. The leaver shaft may be configured to rotate about the shaft axis to translate the linear arm axially relative to the axis to move the moveable wall between the first position and the second arrangement.

In some embodiments, the control system further includes a first sensor configured to detect a pressure of fluid in the inlet and a second sensor configured to detect a pressure of fluid in a bypass duct that is fluidly connected with the scavenge channel. The controller may be configured to activate the actuator to cause the moveable wall to move to the first position in response to a difference between the pressure of fluid in the engine channel and the pressure of fluid in the bypass duct being greater than a predetermined value.

In some embodiments, the controller is configured to receive data indicative of a pressure of fluid in the engine channel and data indicative of a pressure of fluid in a bypass duct. The controller may be configured to activate the actuator to cause the moveable wall to move to the first position in response to a difference between the pressure of fluid in the engine channel and the pressure of fluid in the bypass duct being greater than a predetermined value. In some embodiments, the moveable wall may be configured to translate axially relative to the axis to move between the first position and the second position.

In some embodiments, the inlet particle includes a support case defining a guide slot. The moveable wall may include a first end and a second end spaced apart axially from the first end. The guide slot may receive at least a portion of the second end of the moveable wall when the moveable wall is in the first position and the second position.

According to another aspect of the present disclosure, a method may include a number of steps. The method may method include providing an inlet particle separator having an inner wall arranged around an axis, an outer wall arranged circumferentially around the inner wall to define an engine channel, and a moveable wall arranged circumferentially around the inner wall to define an inlet of the inlet particle separator, moving the moveable wall to a first position relative to the outer wall to cause the moveable wall and the outer wall to define a scavenge channel in fluid communication with the inlet, separating a flow of fluid conducted into the inlet particle separator into an engine core air and a scavenge air with the outer wall, directing the engine core air into the engine channel and the scavenge air into the scavenge channel with the outer wall, moving the moveable wall to a second position relative to the outer wall to block fluid communication between the scavenge channel and the inlet, and directing the flow of fluid conducted into the inlet particle separator into the engine channel.

In some embodiments, moving the moveable wall relative to the outer wall to block fluid communication between the scavenge channel and the inlet includes translating the moveable wall axially. In some embodiments, the method includes conducting bypass air around the inlet particle separator through a bypass channel and moving the moveable wall to the first position automatically in response to a pressure difference between the inlet and the bypass channel being greater than a predetermine value.

In some embodiments, the inlet particle separator further includes an actuator that includes a linear arm coupled with the moveable wall and extending axially aft relative to the axis and a leaver shaft that extends radially along a shaft axis relative to the axis. The method may include rotating the leaver shaft about the shaft axis to cause the leaver shaft to move the linear arm and the moveable wall axially relative to the axis.

These and other features of the present disclosure will become more apparent from the following description of the illustrative embodiments.

BRIEF DESCRIPTION OF THE DRAWINGS

FIGS. 5-7 are cross-sectional views of a second embodiment of an inlet particle separator, in accordance with the present disclosure, including a moveable wall that is variable between a plurality of positions to increase or decrease an amount of particles removed from a flow of fluid;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
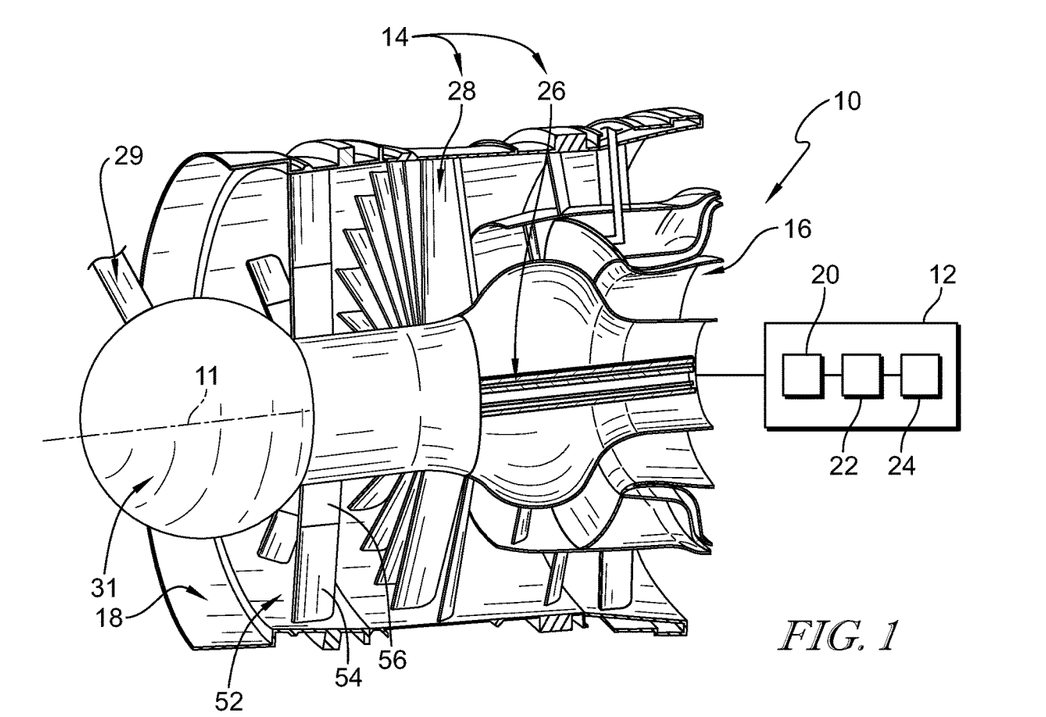
FIG. 1 is a perspective cutaway and diagrammatic view of an inlet of a gas turbine engine in accordance with the present disclosure showing that the gas turbine engine includes an engine core, a propulsion unit driven by the engine core, and a reconfigurable inlet particle separator adapted to selectively remove unwanted particles from an airflow prior to the airflow entering the engine core.

A gas turbine engine 10 in accordance with the present disclosure is shown diagrammatically in FIG. 1. The gas turbine engine 10 includes an engine core 12, a propulsion unit 14 powered by the engine core 12, and an inlet particle separator 16. The engine core 12 received an airflow and is configured to combust a mixture of fuel and the airflow to provide power for the gas turbine engine 10. The propulsion unit 14 includes a drive shaft 26 and a bladed rotor 28 (sometimes referred to as a fan) each coupled with the engine core 12 and driven selectively to rotate about an axis 11 to provide power for the gas turbine engine 10. The drive shaft 26 is driven to rotate by the engine core 12 when the gas turbine engine 10 is in a first operational mode and the bladed rotor 28 is driven to rotate about the axis 11 by the engine core 12 when the gas turbine engine 10 is in a second operational mode. The inlet particle separator 16 is reconfigurable to selectively separate unwanted particles from the airflow prior to the airflow reaching the engine core 12 or to not separate particles from the airflow if, for example, the gas turbine engine 10 is operating in a low or no particle environment.

In the illustrative embodiment, the engine core 12 includes a compressor 20, a combustor 22, and a turbine 24 shown diagrammatically in FIG. 1. The airflow is directed into the gas turbine engine 10 and is conducted toward the compressor 20 as suggested in FIGS. 1 and 2. The compressor 20 compresses the airflow and delivers high-pressure air to the combustor 22. The combustor 22 is configured to ignite a mixture of the compressed air and fuel. Products of the combustion process are directed into the turbine 24 where work is extracted to drive the compressor 20 and at least one of the drive shaft 26 and the bladed rotor 28 depending on which operational mode is being used.

In the illustrative embodiment, the inlet particle separator 16 is reconfigurable as the propulsion unit 14 changes between the first operational mode and the second operational mode to selectively remove unwanted particles from the airflow prior to the airflow reaching the engine core 12. In the illustrative embodiment, the propulsion unit 14 rotates the drive shaft 26 in the first operational mode. As an example, the drive shaft 26 may power an aircraft when the aircraft is located generally in close proximity to the ground. Once the aircraft reaches a sufficient altitude, the propulsion unit 14 may be switched to the second operational mode. The drive shaft 26 is illustratively coupled to a transmission shaft 29 located in a fairing via a gearbox 31 located at a fore end of the gas turbine engine 10.

When the gas turbine engine 10 is located in close proximity to the ground, dirt, sand, dust, or other unwanted particles made be displaced and entrained in the airflow that is to be sent to the engine core 12. Such particles are undesired because they may affect operation efficiencies of the engine core 12 and, hence, may compromise the gas turbine engine's 10 ability to provide adequate thrust. In some circumstances, the inlet particle separator 16 may also be used in the first arrangement to remove unwanted particles from the airflow when the propulsion unit 14 is in the second operational mode.

Figure 2:
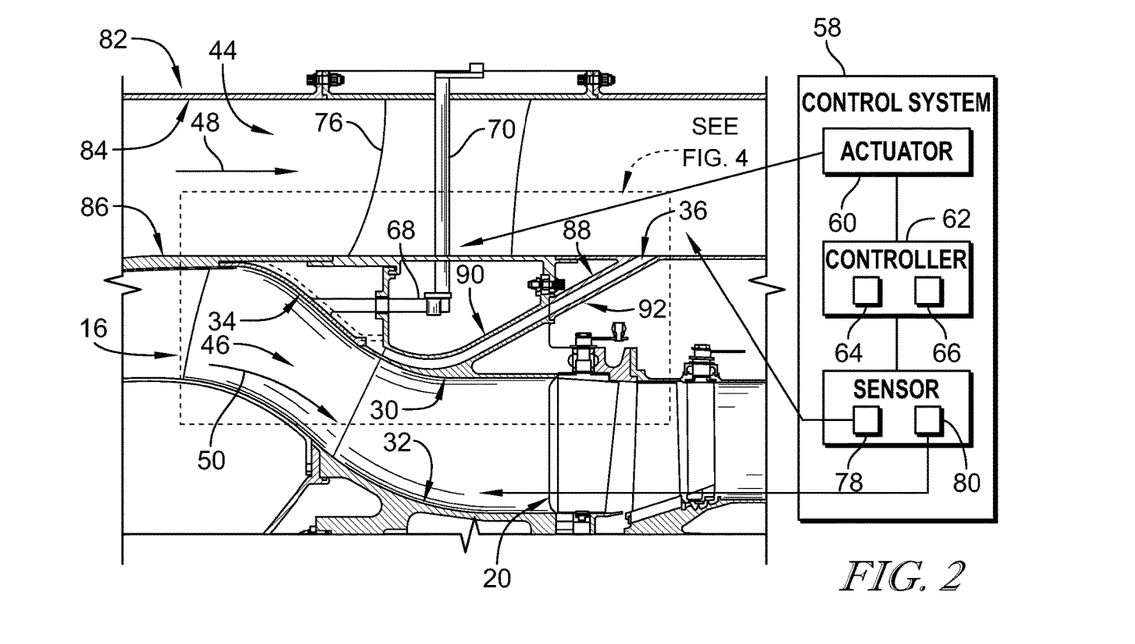
FIG. 2 is a cross-sectional and diagrammatic view of a portion of the gas turbine engine from FIG. 1 showing the inlet particle separator includes an inner wall, an outer wall, and a moveable wall, the moveable wall configured to move selectively relative to the inner wall and the outer wall to cause the inlet particle separator to selectively separate or not to separate particles from the airflow.

The gas turbine engine 10 defines an interior flow path 18 that includes a scavenge channel 36, a bypass channel 44, and an engine channel 46 as shown in FIG. 2. Air passing through the interior flow path 18 of the gas turbine engine 10 is separated into bypass air 48 that flows through the bypass channel 44 and engine core air 50 that flows through the engine channel 46. The bypass air 48 is forced around the engine core 12 by the bladed rotor 28 to provide thrust for the gas turbine engine 10 when the propulsion unit 14 is in the second operational mode. The engine core air 50 is directed through the engine channel 46 toward the engine core 12 for combustion as described above. Under certain circumstances, the scavenge channel 36 opens into the engine channel 46 to remove unwanted particles from the gas turbine engine prior to the engine core air 50 reaching the engine core 12.

In the illustrative embodiment, the inlet particle separator 16 uses inertial forces acting on the unwanted particles in the engine core air 50 when the propulsion unit 14 is in the first operational mode. The engine channel 46 is shaped so that the engine core air 50 is directed radially inward toward the axis 11 upstream of the compressor 20. Unwanted particles entrained in the engine core air 50 tend to have a greater mass and remain on their trajectory through the engine channel 46 so that they do not move radially inward with the rest of the airflow. An inlet 38 to the scavenge channel 36 is positioned along a radially outer boundary of the engine channel 46 to capture the unwanted particles while air with less mass and generally free from particles is directed radially inward toward the compressor 20 as shown in FIG. 3.

Figure 3:
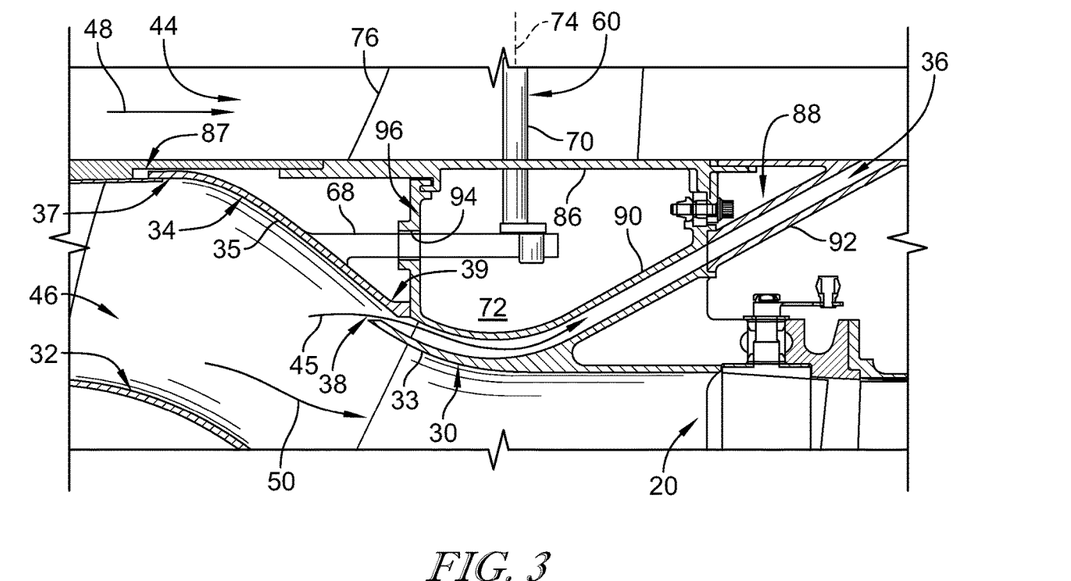
FIG. 3 is a cross-sectional view of a portion of the gas turbine engine showing the moveable wall in a first position in which the inlet particle separator is configured to separate particles from the airflow.
Figure 4:
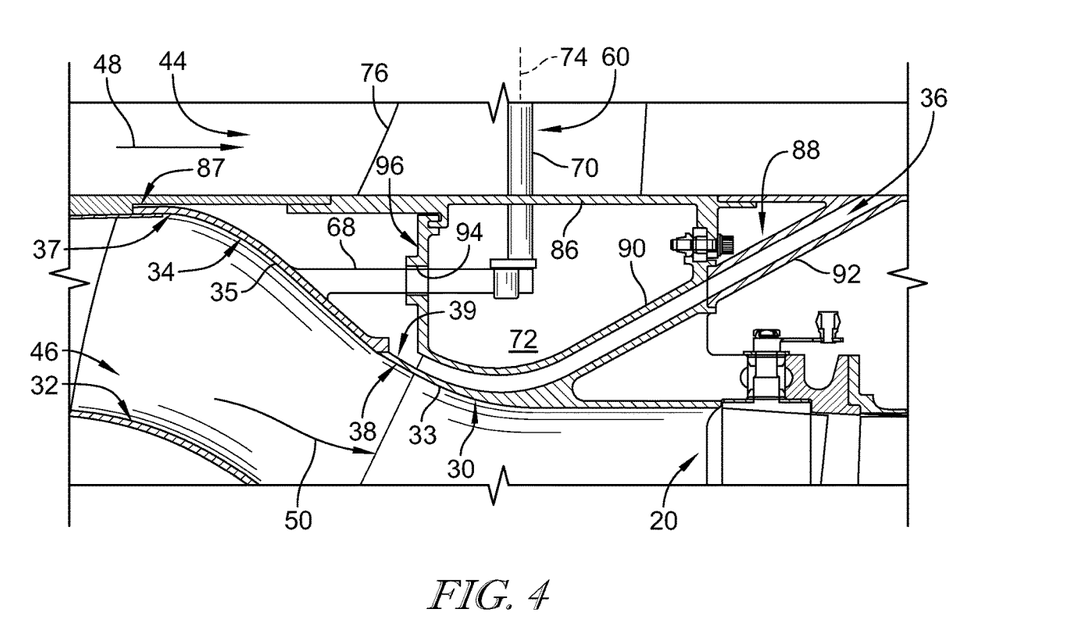
FIG. 4 is a cross-sectional view of a portion of the gas turbine engine showing the moveable wall in the second position to block the inlet particle separator from separating particles and to direct the airflow into the engine core.

The inlet particle separator 16 is configured to move between a first arrangement, as shown in FIG. 3, and a second arrangement, as shown in FIG. 4. The inlet particle separator includes an outer wall 30, an inner wall 32, and a moveable wall 34 that moves relative to the outer wall 30 and the inner wall 32 to establish the first arrangement and the second arrangement.

In the first arrangement, the unwanted particles are directed through the scavenge channel 36 and into the bypass channel 44 to be expelled downstream without entering the engine core 12. In the second arrangement, the moveable wall 34 is translated to close the inlet 38 to the scavenge channel 36 so that all of the engine core air 50 is directed toward the engine core 12 to improve efficiencies of the gas turbine engine 10. For example, closing the inlet 38 to the scavenge channel 36 may reduce pressure losses in the engine core 12.

With the inlet particle separator 16 in the first arrangement, scavenge air 45 with the unwanted particles is conducted from the engine channel 46 to the bypass channel 44 through the scavenge channel 36 as suggested in FIG. 3. A bypass duct 82 defines the bypass channel 44 and includes an outer bypass wall 84 and an inner bypass wall 86 as shown in FIG. 2. The bypass duct 82 is arranged circumferentially around the bladed rotor 28 and the engine core 12. A scavenge duct 88 defines the scavenge channel 36 and extends radially outward from the engine channel 46 interconnecting the outer wall 30 and the inner bypass wall 86 of the bypass duct 82. The scavenge duct 88 includes an outer scavenge wall 90 and an inner scavenge wall 92 that both extend circumferentially around the outer wall 30 of the inlet particle separator 16.

The moveable wall 34 translates relative to the outer wall 30 and the inner wall 32 between a first position to establish the first arrangement, as shown in FIG. 3, and a second position to establish the second arrangement, as shown in FIG. 4. In the first position, the moveable wall 34 is spaced apart from the outer wall 30 to open and define the inlet 38 to the scavenge channel 36 therebetween. When the moveable wall 34 is in the second positon, the outer wall 30 and the moveable wall 34 engage one another to close the inlet 38 to the scavenge channel 36. With the moveable wall 34 in the second positon and the scavenge channel 36 closed, back pressure is reduced in the engine channel 46.

The moveable wall 34 has a curvilinear cross-sectional shape with a flow path surface 35 facing upstream as shown in FIGS. 2-4. The flow path surface 35 of the moveable wall 34 directs at least a portion of the engine core air 50 and unwanted particles entrained in the engine core air 50 toward the inlet 38 of the scavenge channel 36 when the moveable wall 34 is in the first position. When the moveable wall 34 is translated to the second position, the flow path surface 35 becomes generally flush with a radially-inner surface 33 of the outer wall 30 to provide a smooth transition from the flow path surface 35 to the radially-inner surface 33. This arrangement minimizes pressure loss of the engine core air 50 traveling toward the engine core 12 and improves efficiencies of the gas turbine engine 10.

An axially-forward end 37 of the moveable wall 34 engages the inner bypass wall 86 when the moveable wall 34 is in the first and second positions as shown in FIGS. 3 and 4. When the moveable wall 34 is translated to the first position, an axially-aft end 39 of the moveable wall 34 engages the outer scavenge wall 90 and is spaced apart from the outer wall 30 to define the inlet 38. In some embodiments, the location of the forward end 37 of the moveable wall 34 relative to the inner bypass wall 86 may provide a slight step where the forward end 37 engages the inner bypass wall 86. The inner bypass wall 86 may be formed to include a slot 87 that receives the forward end 37 of the moveable wall 34 to minimize pressure losses or turbulence where the step is located.

In the illustrative embodiment, the gas turbine engine 10 further includes a control system 58 that is configured to change the inlet particle separator 16 from the first arrangement to the second arrangement as suggested in FIG. 2. As an example, the control system 58 is configured to change the inlet particle separator 16 from the first arrangement to the second arrangement in response to the propulsion unit 14 changing from the first operational mode to the second operational mode. The control system 58 includes an actuator 60 coupled with the moveable wall 34 and a controller 62 coupled with the actuator 60. The actuator 60 is configured to move the moveable wall 34 between the first position and the second position. The controller 62 includes a microprocessor 64 and a memory storage device 66 storing instructions that, when executed, activate the actuator 60 to cause the actuator 60 to move the moveable wall 34 between the first position and the second position. In the illustrative embodiment, only one actuator 60 is shown; however, in other embodiments a plurality of actuators 60 may be spaced circumferentially around the axis 11 and coupled with the control system 58 to move the moveable wall 34 in unison with one another.

The actuator 60 includes a linear arm 68 coupled with the moveable wall 34 and extending axially relative to the axis 11 and a leaver shaft 70 coupled with the linear arm 68 as shown in FIGS. 2-4. The linear arm 68 is located at least partially within a cavity 72 formed between the inner bypass wall 86 of the bypass duct 82, the outer scavenge wall 90 of the scavenge duct 88, and the moveable wall 34. The leaver shaft 70 extends radially outward away from the axis 11 along a shaft axis 74 through a strut 76 or vane located in the bypass channel 44. The leaver shaft 70 is configured to rotate about the shaft axis 74 to translate the linear arm 68 axially relative to the axis 11 to move the moveable wall 34 between the first position and the second position to selectively remove particles from the engine core air 50. In another embodiment, the leaver shaft 70 may be omitted and a linear actuator (not shown) may be located in the cavity 72 to move the moveable wall 34 and the linear arm 68 axially forward and aft between the first position and the second position.

In the illustrative embodiment, an extension 96 of the outer scavenge wall 90 extends radially outward through the cavity 72 and is positioned axially between the moveable wall 34 and the leaver shaft 70 as shown in FIGS. 3 and 4. The extension 96 of the outer scavenge wall 90 is formed to include a guide aperture 94 that receives the linear arm 68 to guide movement of the moveable wall 34 between the first position and the second position. The extension 96 also blocks fluids and particles from reaching the junction between the linear arm 68 and the leaver shaft 70.

In the illustrative embodiment, the control system 58 is configured to move the moveable wall 34 to the first position to remove unwanted particles from the engine core air 50 in response to sensing a predetermined pressure differential between the bypass channel 44 and the engine channel 46. The control system 58 further includes a first sensor 78 configured to detect a pressure of the engine core air 50 in the engine channel 46 and a second sensor 80 configured to detect a pressure of the bypass air 48 in the bypass channel 44.

The first and second sensors 78, 80 provide signals indicative of pressures of the fluid in the engine channel 46 and the bypass channel 44, respectively. The signals provided by the sensors 78, 80 are output to the controller 62 which converts the signals to data indicative of the pressures in the engine channel 46 and the bypass channel 44. The controller 62 compares the data and calculates the pressure differential between the engine channel 46 and the bypass channel 44. The controller 62 is configured to activate the actuator to cause the moveable wall 34 to move to the first position in response to the pressure differential between the pressure of engine core air 50 and the pressure of bypass air 48 being greater than the predetermined value. In one example, the pressure differential between the pressure of engine core air 50 and the pressure of bypass air 48 is greater than the predetermined value when the propulsion unit 14 is in the first operational mode.

In other embodiments, the control system 58 is a mechanical controller configured to move the movable wall 34 between the first position and the second position in response to pressure difference between the engine core air 50 and the bypass air 48. As one example, control system 58 includes a pneumatic valve in fluid communication with the engine core air 50 and the bypass air 48.

The propulsion unit 14 further includes a plurality of variable-pitch vanes 52 arranged circumferentially around the axis 11 and axially forward of the engine core 12 and the inlet particle separator 16 as shown in FIG. 1. Each variable-pitch vane 52 is radially split and includes an outer member 54 and an inner member 56. The outer members 54 are rotatable relative to the inner members 56 to reduce airflow through the bypass channel 44 and to direct a majority of the airflow into the engine channel 46 when the propulsion unit 14 is in the first operational mode. As described above, in the first operational mode, the moveable wall 34 of the inlet particle separator 16 is in the first position so that the inlet 38 of the scavenge channel 36 is opened to remove the unwanted particles from the engine core air 50.

Figure 5:
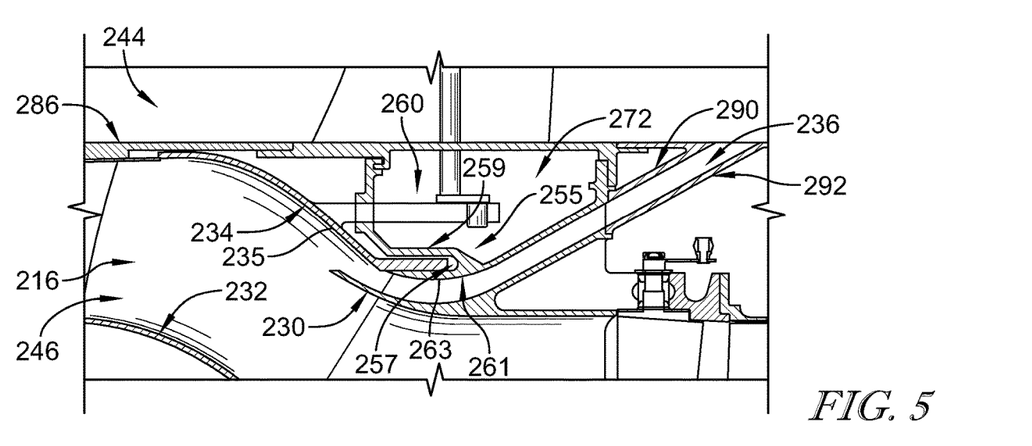
FIG. 5 is a cross-sectional view of the second embodiment of the inlet particle separator showing the movable wall in a fully open position to cause the inlet particle separator to use a relatively large amount of the airflow to separate unwanted particles from the airflow.
Figure 6:
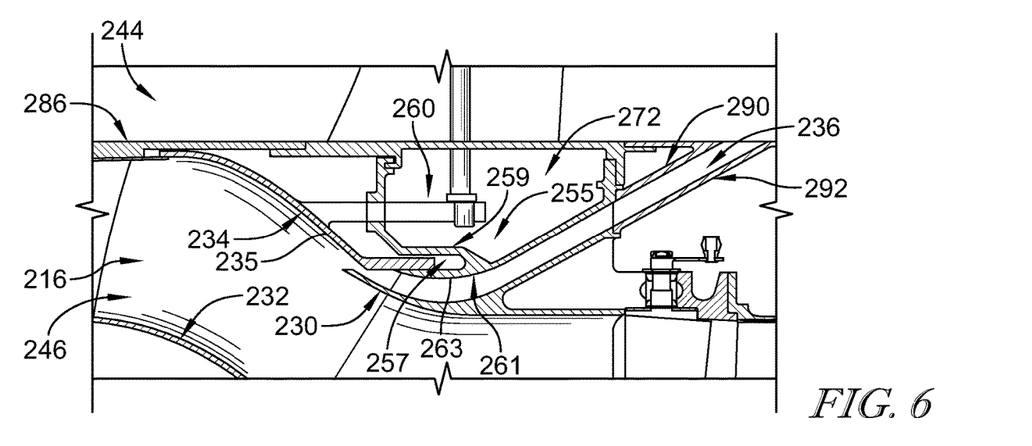
FIG. 6 is a cross-sectional view of the inlet particle separator of FIG. 5 with the moveable wall in an intermediate position to cause the inlet particle separator to use a relatively smaller amount of airflow to separate unwanted particles from the airflow compared to when the movable wall is in the first position.
Figure 7:
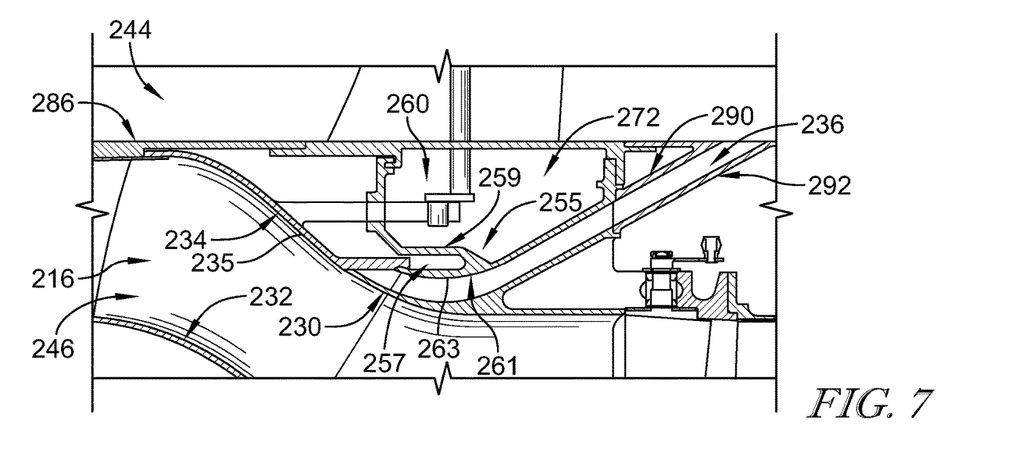
FIG. 7 is a cross-sectional view of the inlet particle separator of FIG. 5 with the moveable wall in a closed position where the inlet particle separator is not configured to separate particles from the airflow and the moveable wall provides a smooth flow path surface leading to the engine core.

Another embodiment of an inlet particle separator 216 is shown in FIGS. 5-7. The inlet particle separator 216 is substantially similar to inlet particle separator 16 and similar reference numbers are used to describe similar features common between inlet particle separator 216 and inlet particle separator 16. Accordingly, the disclosure above relating to inlet particle separator 16 is hereby incorporated herein for inlet particle separator 216 except for the differences between inlet particle separator 16 and inlet particle separator 216 described below.

Inlet particle separator 216 includes an outer wall 230, an inner wall 232, and a moveable wall 234 that moves relative to the outer wall 230 and the inner wall 232. The moveable wall 234 is translated between the first position, as shown in FIG. 5, and the second position, as shown in FIG. 7, in a similar fashion to moveable wall 34 of inlet particle separator 16. However, moveable wall 234 may also be moved to any intermediate position between the first position and the second position to selectively use more or less air to separate particles to balance pressure losses and the desire to remove particles as shown in FIG. 6. The plurality of intermediate positions allows the particle separator 216 to use an amount of air in proportion to the amount of particles entrained in the air.

The inlet particle separator further includes a support case 255 that defines a guide slot 257 as shown in FIGS. 5-7. An axially-aft end 239 of the moveable wall 234 is received in the guide slot 257 and translates relative to the support case 255. The support case 255 blocks fluids and particles from flowing passed the moveable wall and into cavity 272 without flowing through scavenge channel 236 and into bypass channel 244.

In the illustrative embodiment, the support case 255 is formed as a part of outer scavenge wall 290 and includes a first segment 259 and a second segment 261 that define the guide slot 257 radially between one another. The first segment 259 defines a portion of the cavity 272. The second segment defines a portion of the scavenge channel 236. The moveable wall 234 is shaped to provide a smooth transition between the flow path surface 235 of the moveable wall 234 and a surface 263 of the second segment 261 defining the portion of the scavenge channel 236.

In illustrative embodiments, the inlet particle separator 16, 216 may include an engine section stator vane, a fan frame, an inner bypass duct (30 and 32), translating duct 34 and actuator lever arms 68,70. The gas turbine engine 10 may be placed in a non-operational mode (i.e. second operational mode) where particle separation is not desired and there would be no penalty on engine performance. The translating duct slides rearward to open a channel 36 for particle removal in the first operational mode. Due to the flow path shape between the engine section stator vane and fan frame, heavier particles would tend to follow along the surface 35 of the translating duct 34 and be captured by the integrated channel 36, 38. A benefit to this design may be an amount of particle removal when desired and reduced loss in engine performance when not needed.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core including a compressor, a combustor, and a turbine,
a propulsion unit powered by the engine core, the propulsion unit including a drive shaft coupled with the engine core and configured to be driven to rotate about an axis by the turbine when the gas turbine engine is in a first operational mode and a bladed rotor coupled with the engine core and configured to be driven to rotate about the axis by the turbine when the gas turbine engine is in a second operational mode, and
an inlet particle separator configured to receive a flow of fluid and to move between a first arrangement in response to the gas turbine engine being in the first operational mode and a second arrangement in response to the gas turbine engine being in the second operational mode,
wherein the inlet particle separator separates the flow of fluid into engine core air and scavenge air and directs the engine core air toward the compressor of the engine core and directs the scavenge air around the engine core when the inlet particle separator is in the first arrangement and wherein the inlet particle separator does not separate the flow of fluid and directs the flow of fluid toward the compressor of the engine core when the inlet particle separator is in the second arrangement,
further comprising a bypass duct arranged around the bladed rotor and the engine core to define a bypass channel and configured to conduct bypass air around the engine core and the inlet particle separator directs the scavenge air into the bypass channel and around the engine core when the inlet particle separator is in the first arrangement.

2. The gas turbine engine of claim 1, wherein the inlet particle separator includes an inner wall, an outer wall, and a moveable wall, the inner wall is arranged circumferentially around the axis, the outer wall is arranged circumferentially around the inner wall, the moveable wall is arranged circumferentially around the inner wall and configured to move relative to the outer wall between a first position and a second position, the inlet particle separator is in the first arrangement when the moveable wall is in the first position, and the inlet particle separator is in the second arrangement when the moveable wall is in the second position.

3. The gas turbine engine of claim 2, wherein the moveable wall and the inner wall define an inlet of the inlet particle separator configured to receive the flow of fluid, the inner wall and the outer wall define an engine channel in fluid communication with the compressor, the moveable wall is spaced apart from the outer wall to define an inlet to a scavenge channel between the moveable wall and the outer wall when the moveable wall is in the first position, the inlet particle separator is configured to conduct the scavenge air into the scavenge channel when the inlet particle separator is in the first arrangement, and the moveable wall engages the outer wall to close the inlet to the scavenge channel when the inlet particle separator is in the second arrangement.

4. The gas turbine engine of claim 2, wherein the moveable wall is configured to translate between the first position and the second position.

5. The gas turbine engine of claim 1, wherein the inlet particle separator includes an inner wall arranged circumferentially around the axis, an outer wall arranged circumferentially around the inner wall to define an engine channel, and a moveable wall arranged around the inner wall to define an inlet of the inlet particle separator, the engine channel is configured to direct the flow of fluid into the engine core of the gas turbine engine, the moveable wall is spaced apart from the outer wall to define a scavenge channel that is fluidly connected with the inlet and the bypass channel when the moveable wall is in the first position, and the moveable wall engages the outer wall and blocks fluid communication between the inlet and the bypass channel through the scavenge channel when the moveable wall is in the second position.

6. The gas turbine engine of claim 5, wherein the inlet particle separator includes a controller configured to move the moveable wall to the first position in response to a difference in pressure between the inlet and the bypass channel being greater than a predetermined value.

7. The gas turbine engine of claim 1, further comprising a plurality of variable pitch airfoils located upstream of the inlet particle separator and each of the variable pitch airfoils includes an inner member and an outer member located radially outward of the inner member and rotatable relative to the inner member.

8. The gas turbine engine of claim 7, wherein the outer member of each of the variable pitch airfoils is rotated relative to the inner member to reduce the flow of fluid through the outer member when the gas turbine engine is in the first operational mode and the outer member of each of the variable pitch airfoils is generally aligned with the inner member when the gas turbine engine is in the second operational mode.

9. An inlet particle separator for a gas turbine engine, the inlet particle separator comprising
an inner wall arranged circumferentially around an axis,
an outer wall arranged circumferentially around the inner wall, the inner wall and the outer wall cooperate to define an engine channel configured to direct fluid into an engine core of the gas turbine engine, and
a moveable wall located axially at least partially upstream of the outer wall and arranged circumferentially around the inner wall to define the engine channel radially between the moveable wall and the inner wall,
wherein the moveable wall is moveable between a first position in which the moveable wall is spaced apart from the outer wall to define an inlet to a scavenge channel radially between the moveable wall and the outer wall and to separate fluid flow into scavenge air directed into the scavenge channel and engine core air directed into the engine channel and a second position in which the moveable wall is engaged with the outer wall to close the scavenge channel so that all of the fluid flow is directed into the engine channel,
further comprising a support case defining a guide slot, the moveable wall includes a first end and a second end spaced apart axially from the first end and the guide slot receives at least a portion of the second end of the moveable wall when the moveable wall is in the first position and the second position.

10. The inlet particle separator of claim 9, further comprising a control system that includes an actuator coupled with the moveable wall and configured to move the moveable wall between the first position and the second position and a controller connected with the actuator and configured to activate the actuator.

11. The inlet particle separator of claim 10, wherein the actuator includes a linear arm coupled with the moveable wall and extending axially relative to the axis and a leaver shaft coupled with the linear arm, the leaver shaft extends radially outward away from the axis along a shaft axis, and the leaver shaft is configured to rotate about the shaft axis to translate the linear arm axially relative to the axis to move the moveable wall between the first position and the second arrangement.

12. The inlet particle separator of claim 10, wherein the control system further includes a first sensor configured to detect a pressure of fluid in the engine channel and a second sensor configured to detect a pressure of fluid in a bypass duct that is fluidly connected with the scavenge channel and the controller is configured to activate the actuator to cause the moveable wall to move to the first position in response to a difference between the pressure of fluid in the engine channel and the pressure of fluid in the bypass duct being greater than a predetermined value.

13. The inlet particle separator of claim 10, wherein the controller is configured to receive data indicative of a pressure of fluid in the engine channel and data indicative of a pressure of fluid in a bypass duct and the controller is configured to activate the actuator to cause the moveable wall to move to the first position in response to a difference between the pressure of fluid in the engine channel and the pressure of fluid in the bypass duct being greater than a predetermined value.

14. The inlet particle separator of claim 9, wherein the moveable wall is configured to translate axially relative to the axis to move between the first position and the second position.

15. A method comprising
providing an inlet particle separator having an inner wall arranged around an axis, an outer wall arranged circumferentially around the inner wall to define an engine channel, and a moveable wall arranged circumferentially around the inner wall to define an inlet of the inlet particle separator,
moving the moveable wall to a first position relative to the outer wall to cause the moveable wall and the outer wall to define a scavenge channel in fluid communication with the inlet,
separating a flow of fluid conducted into the inlet particle separator into an engine core air and a scavenge air with the outer wall,
directing the engine core air into the engine channel and the scavenge air into the scavenge channel with the outer wall,
moving the moveable wall to a second position relative to the outer wall to block fluid communication between the scavenge channel and the inlet, and
directing the flow of fluid conducted into the inlet particle separator into the engine channel,
further comprising conducting bypass air around the inlet particle separator through a bypass channel and moving the moveable wall to the first position automatically in response to a pressure difference between the inlet and the bypass channel being greater than a predetermine value.

16. The method of claim 15, wherein moving the moveable wall relative to the outer wall to block fluid communication between the scavenge channel and the inlet includes translating the moveable wall axially.

17. The method of claim 15, wherein the inlet particle separator further includes an actuator that includes a linear arm coupled with the moveable wall and extending axially aft relative to the axis and a leaver shaft that extends radially along a shaft axis relative to the axis, and the method further includes rotating the leaver shaft about the shaft axis to cause the leaver shaft to move the linear arm and the moveable wall axially relative to the axis.

\* \* \* \* \*